United States Patent
Staalesen

(10) Patent No.: US 7,485,979 B1
(45) Date of Patent: Feb. 3, 2009

(54) METHOD AND SYSTEM FOR CONTROLLING POWER GENERATOR HAVING HYDRAULIC MOTOR DRIVE

(76) Inventor: Haakon A. Staalesen, Hyvingeveien 11, Egersund (NO) 4370

( * ) Notice: Subject to any disclaimer, the term of this patent is extended or adjusted under 35 U.S.C. 154(b) by 232 days.

(21) Appl. No.: 11/561,364

(22) Filed: Nov. 17, 2006

Related U.S. Application Data

(60) Provisional application No. 60/737,941, filed on Nov. 17, 2005.

(51) Int. Cl.
F03D 9/00 (2006.01)
H02P 9/04 (2006.01)
F16H 47/04 (2006.01)
F16H 47/08 (2006.01)
F16D 31/02 (2006.01)
H01F 1/00 (2006.01)
H01F 3/00 (2006.01)
H02J 1/16 (2006.01)
H02J 3/30 (2006.01)
H02J 9/00 (2006.01)

(52) U.S. Cl. ............................ 290/44; 475/31; 60/456; 307/68

(58) Field of Classification Search ................... 290/44; 475/31; 60/456; 307/68
See application file for complete search history.

(56) References Cited

U.S. PATENT DOCUMENTS

| | | | | |
|---|---|---|---|---|
| 3,714,846 A | * | 2/1973 | Louis et al. | 475/79 |
| 3,774,217 A | | 11/1973 | Bonner | 340/825.21 |
| 3,806,733 A | * | 4/1974 | Haanen | 290/55 |
| 3,832,965 A | | 9/1974 | Walker | 114/321 |
| 4,022,021 A | * | 5/1977 | Russell, Jr. | 60/420 |
| 4,031,702 A | * | 6/1977 | Burnett et al. | 60/398 |
| 4,149,092 A | * | 4/1979 | Cros | 290/54 |
| 4,206,608 A | * | 6/1980 | Bell | 60/698 |
| 4,229,661 A | * | 10/1980 | Mead et al. | 290/44 |
| 4,232,570 A | * | 11/1980 | Gibson | 477/68 |
| 4,259,881 A | * | 4/1981 | Meyerle | 475/72 |
| 4,274,010 A | * | 6/1981 | Lawson-Tancred | 290/55 |
| 4,280,061 A | * | 7/1981 | Lawson-Tancred | 290/55 |
| 4,341,132 A | * | 7/1982 | Burdick | 475/72 |
| 4,347,701 A | * | 9/1982 | Eddens et al. | 60/413 |
| 4,447,738 A | * | 5/1984 | Allison | 290/44 |
| 4,461,957 A | * | 7/1984 | Jallen | 290/44 |

(Continued)

FOREIGN PATENT DOCUMENTS

JP 405201631 A 8/1993

(Continued)

*Primary Examiner*—Nicholas Ponomarenko
*Assistant Examiner*—Pedro J Cuevas

(57) ABSTRACT

A power generator system that is suitable for use on medium-sized and large watercraft. The system includes a generator that is driven by a hydraulic motor that is coupled to the main engine through a variable hydraulic pump. In order to maintain a stable, substantially constant-frequency power output from the generator as the main engine operates over a wide range of operating speeds, a controller receives a power frequency input signal and a hydraulic pump speed input signal, and uses both of these input signals to generate an output control signal to the hydraulic pump to maintain a substantially constant fluid flow to the hydraulic motor. The frequency signal is used to determine whether to increase or decrease the fluid flow, and the pump speed signal is used to determine the rate of change of the fluid flow in order to avoid overshooting the desired frequency.

9 Claims, 3 Drawing Sheets

U.S. PATENT DOCUMENTS

| | | | | |
|---|---|---|---|---|
| 4,496,846 A * | 1/1985 | Parkins | .................. | 290/44 |
| 4,496,847 A * | 1/1985 | Parkins | .................. | 290/44 |
| 4,498,017 A * | 2/1985 | Parkins | .................. | 290/44 |
| 4,597,352 A | 7/1986 | Norminton | .................. | 114/254 |
| 4,613,763 A * | 9/1986 | Swansen | .................. | 290/44 |
| 4,713,896 A | 12/1987 | Jennens | .................. | 37/308 |
| 4,774,855 A * | 10/1988 | Murrell et al. | .................. | 475/31 |
| 5,027,000 A * | 6/1991 | Chino et al. | .................. | 290/53 |
| 5,048,445 A | 9/1991 | Lever | .................. | 114/222 |
| 5,319,610 A | 6/1994 | Airhart | .................. | 367/82 |
| 5,373,198 A * | 12/1994 | Lopez Jimenez | .................. | 307/68 |
| 5,635,689 A | 6/1997 | Shepard | .................. | 187/292 |
| 5,778,671 A * | 7/1998 | Bloomquist et al. | .................. | 60/456 |
| 5,865,602 A | 2/1999 | Nozari | .................. | 417/44.1 |
| 5,924,283 A * | 7/1999 | Burke, Jr. | .................. | 60/325 |
| 6,082,084 A * | 7/2000 | Reimers et al. | .................. | 56/11.9 |
| 6,129,525 A | 10/2000 | Reynolds | .................. | 417/395 |
| 6,166,349 A | 12/2000 | Williams | .................. | 219/133 |
| 6,265,785 B1 * | 7/2001 | Cousineau et al. | .................. | 290/44 |
| 6,349,882 B1 | 2/2002 | Kita | .................. | 236/34 |
| 6,527,660 B1 * | 3/2003 | Sugden | .................. | 475/77 |
| 6,644,004 B2 * | 11/2003 | Reimers et al. | .................. | 56/14.7 |
| 6,748,737 B2 * | 6/2004 | Lafferty | .................. | 60/398 |
| 6,857,253 B2 * | 2/2005 | Reimers et al. | .................. | 56/10.6 |
| 6,927,503 B2 * | 8/2005 | Enis et al. | .................. | 290/55 |
| 6,963,802 B2 * | 11/2005 | Enis et al. | .................. | 702/2 |
| 7,067,937 B2 * | 6/2006 | Enish et al. | .................. | 290/55 |
| 7,081,689 B2 * | 7/2006 | Tilscher et al. | .................. | 290/44 |
| 7,095,131 B2 * | 8/2006 | Mikhail et al. | .................. | 290/44 |
| 7,183,664 B2 * | 2/2007 | McClintic | .................. | 290/55 |
| 7,231,763 B2 * | 6/2007 | Suzuki et al. | .................. | 60/413 |
| 7,250,691 B2 * | 7/2007 | Enis et al. | .................. | 290/55 |
| 7,259,471 B2 * | 8/2007 | Basteck | .................. | 290/43 |
| 2002/0060500 A1 * | 5/2002 | Lafferty | .................. | 310/11 |
| 2002/0125723 A1 * | 9/2002 | Staalesen | .................. | 290/40 B |
| 2002/0189222 A1 * | 12/2002 | Reimers et al. | .................. | 56/14.7 |
| 2004/0055266 A1 * | 3/2004 | Reimers et al. | .................. | 56/7 |
| 2007/0024058 A1 * | 2/2007 | McClintic | .................. | 290/44 |
| 2007/0138798 A1 * | 6/2007 | McClintic | .................. | 290/44 |
| 2008/0022686 A1 * | 1/2008 | Amdall et al. | .................. | 60/716 |
| 2008/0083222 A1 * | 4/2008 | Hubert | .................. | 60/698 |

FOREIGN PATENT DOCUMENTS

JP    405286671 A    11/1993

* cited by examiner

METHOD AND SYSTEM FOR CONTROLLING POWER GENERATOR HAVING HYDRAULIC MOTOR DRIVE

CROSS-REFERENCE TO RELATED APPLICATION

This application claims the benefit of Provisional Application No. 60/737,941, filed Nov. 17, 2005, the benefit of which is hereby claimed under 35 U.S.C. § 119.

BACKGROUND

In marine vessels and other applications, it is typically desirable to provide a steady, reliable electric power source that is suitable for operating relatively sensitive electronic equipment as well as other, more robust, electrical devices.

Medium-sized and large commercial and/or recreational watercraft often incorporate one or more on-board auxiliary diesel engines that drive one or more electric generators to produce necessary electric power for the electrical and electronic equipment on board the vessel that are separate from the main engine system. An advantage of an independent generator system is that it can provide electrical power to the vessel, even when the main engine is not operating. However, the disadvantage of such conventional systems that require one or more auxiliary engines is that they increase fuel consumption and costs; increase the emission of hydrocarbons and other combustion byproducts to the environment; incur additional costs associated with the manufacturing, installation and maintenance of the auxiliary engines; and require the dedication of space on the vessel to the auxiliary diesel engines.

Alternatively, it is known that electric power may be generated using a shaft-driven generator driven directly by the vessel's main engine. A direct-drive system can produce electric power very economically and with relatively low additional effluent of hydrocarbon to the environment. However, to produce a stable electrical power output a direct-drive electrical generator system requires operation of the main engine for power, and at a constant speed, and is therefore only applicable to a few types of vessels.

A present inventor has previously disclosed a system that provides a hydraulic drive that variably connects a power generator to a vessel main engine in U.S. patent application Ser. No. 09/801,049, which is hereby expressly incorporated by reference in its entirety. The system described in the reference application drives a generator from the main engine via a variable output hydraulic pump that is fluidly connected to a constant volume hydraulic motor, wherein the hydraulic pump controller relies only on the frequency deviation on the generator output for controlling the oil quantity from the hydraulic pump. If the output power frequency is too low, the hydraulic pump output is increased, and if the output power frequency is too high, the hydraulic pump output is decreased. In practice, however, the system disclosed in this prior application did not provide sufficient real-time control of the generator speed over the necessary range of main engine speed variations to produce a sufficiently stable power output to accommodate modern electronic equipment.

Therefore, there remains a need for a power generator system suitable for use on a marine vessel that powers the generator by the vessel main engine with improved control of the speed of the generator.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In the system described herein, an electric generator is operated from the ship's main engine. The main engine, of course, operates at variable speeds as dictated by propulsion requirements. The system includes a variable volume/variable speed hydraulic pump that is driven from the main engine. The hydraulic pump provides the oil or working fluid to a hydraulic motor that is operably connected to the electric generator. A means for regulating the oil quantity from the pump in dependence on supplied electronic signals is provided, such that the hydraulic motor (and therefore the generator) can maintain a relatively constant speed.

An important aspect of the disclosed system is that the output of the variable hydraulic pump, which in the currently preferred system is adjusted through the hydraulic pump swash plate, is controlled with a signal that uses feedback from both the frequency output of the generator and the speed of the variable hydraulic pump (or the main engine). In prior art systems that control the variable hydraulic pump output using only the frequency output of the generator, the system does not remain stable. In particular, by using the hydraulic pump speed in generating the control signal to control the swash plate, the tendency of the system to overcorrect or overshoot a desired adjustment can be reduced or eliminated.

In another aspect of an embodiment of the invention, a teach-in function is provided wherein the system uses test results from high and low engine speeds (high and low hydraulic pump speeds) to determine an optimal control signal for controlling the output of the hydraulic pump over the expected operating speed range of the main engine.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
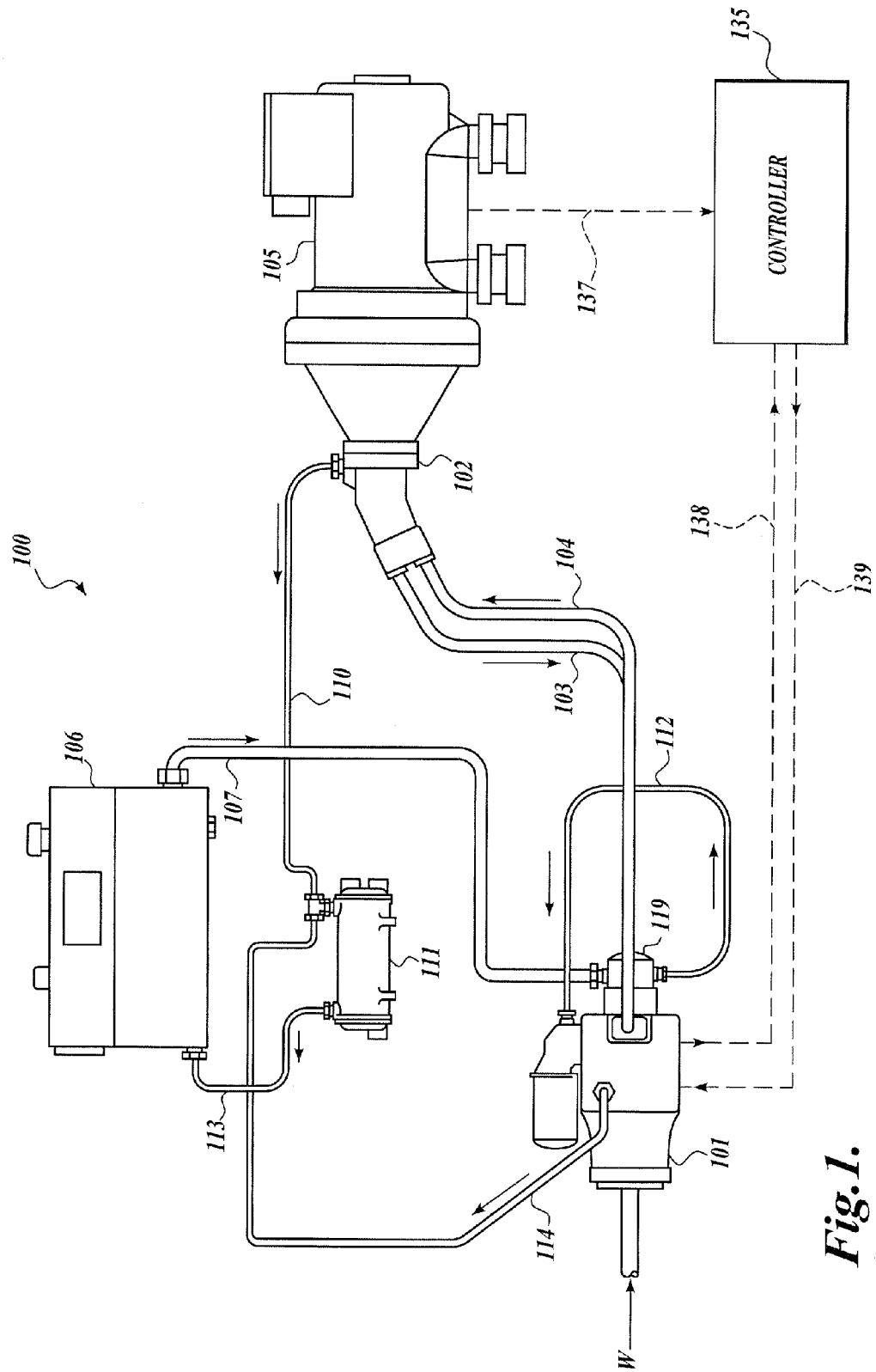
FIG. 1 shows the principal components of an embodiment of an electric power system in accordance with the present invention.

Refer now to FIG. 1, which shows an embodiment of an electrical power marine generator system 100 in accordance with the present invention that is suitable for installation on a medium-sized to large watercraft. Many of the principal components are similar to, or the same as, the components identified in the system disclosed in U.S. patent application Ser. No. 09/801,049 (incorporated by reference above) of the present inventor. Improvements to the system have been incorporated that have been found to greatly improve the viability of the system for its intended application, as described in detail below. For brevity and clarity, conventional aspects of the hydraulic installation are not described in detail, as they will be readily apparent to persons of skill in the art.

The marine generator system 100 includes six primary components: (i) a variable hydraulic pump 101 that may be operated, for example, directly from a power take-out or through a transmission on a main propulsion engine 120 (see FIG. 2); (ii) a constant volume hydraulic motor 102 that is connected directly to a generator 105; (iii) a controller 135 for controlling the fluid output of the variable hydraulic pump 101, for example by controlling the position of a swash plate in the variably hydraulic pump 101; (iv) the generator 105; (v) an oil cooling system 111; and (vi) sensors and switches communicating with the controller 135, discussed below.

The general operation of the generator system 100 is as follows. The variable hydraulic pump 101 is driven from a power take-off of the main engine, as indicated by the W and arrow in FIG. 1. The hydraulic pump 101 circulates oil from and to the hydraulic motor 102 through hoses 103 and 104, respectively. The main engine (not shown), typically a main drive engine for a watercraft, operates over a range of rotational speeds during operation of the generator system 100.

The hydraulic motor 102 is of a fixed type, and is drivably connected to the generator 105. The hydraulic motor 102 is driven by the primary flow of oil delivered under pressure from the variable hydraulic pump 101. A secondary flow of the hydraulic oil is diverted from the pump 101 through hose 114 to the oil cooling system 111, and similarly a flow of oil is diverted from the hydraulic motor 102 to the oil cooling system 111 through hose 110. Cooled oil is directed from the oil cooling system 111 to an oil reservoir 106 through hose 113, and make-up hydraulic oil is directed through hose 107 to a servo pump 119 and returned to the variable hydraulic pump 101 through hose 112. Although the described hydraulic fluid flow path is described to assist the reader in understanding the system, persons of ordinary skill in the art will understand that straightforward modifications to this system may be made without departing from the present invention.

Therefore, in the generator system 100 shown in FIG. 1, the hydraulic oil from the variable pump 101 drives the hydraulic motor 102, and therefore the generator 105. The generator 105 rotational speed (and therefore the output power frequency) is clearly dependent on the rate of flow of oil from the variable pump 101 to the motor 102. Maintaining a suitably constant and stable rotational speed for the generator 105 has proven to be a challenge in prior art systems.

The controller 135 in the present system, which controls the flow rate of hydraulic fluid from the variable hydraulic pump 101, is shown schematically in FIG. 1. The controller 135 receives a power frequency input signal 137 from a transformer or an electronic frequency transmitter 132 (see FIG. 2) that is electrically connected to, or integrated into, the generator 105, and a pump speed input signal 138 from the variable hydraulic pump 101. In the current embodiment the power frequency input signal 137 is a 24 V signal to the controller. These two input signals 137, 138 are utilized by the controller 135 to generate an output control signal 139 to the variable hydraulic pump 101, to selectively control the rate of flow of hydraulic fluid from the variable hydraulic pump 101, the output control signal 139 being calculated to maintain a constant oil flow rate from the variable hydraulic pump 101.

Figure 2:
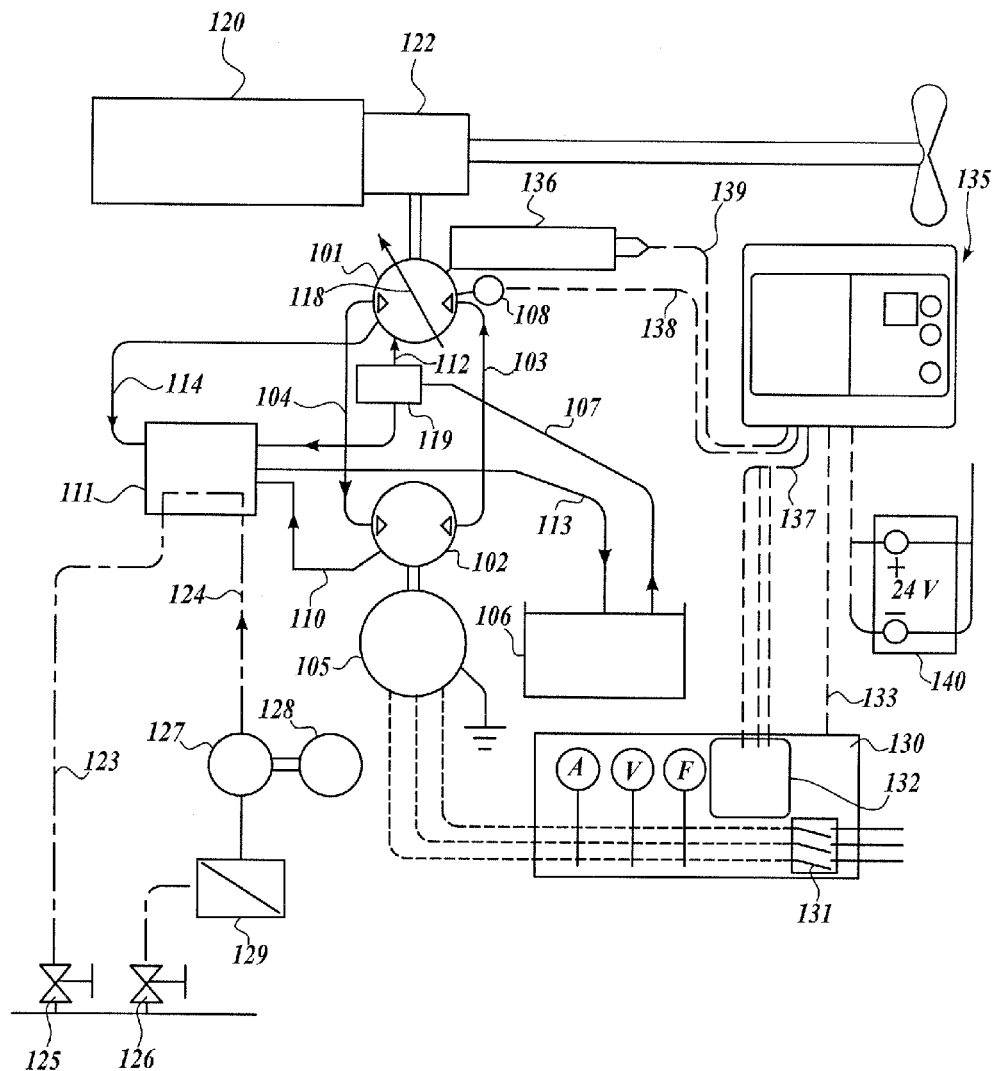
FIG. 2 shows a typical marine installation of the electric power system shown in FIG. 1.

A block diagram of an embodiment of the generator system 100 is shown in FIG. 2, wherein the generator system 100 is presumed to be installed on a watercraft (not shown). The main engine 120 is connected to the variable hydraulic pump 101 through a gear box 122. In this embodiment, sea water is used as a working fluid for the heat exchanger for the oil cooling system 111. The sink-side cooling water enters the cooling system 111 through line 124 and valve 126, and exits through line 123 and valve 125. Sea water is drawn in by the cooling water pump 127, driven by a motor 128. A mudbox 129 is provided in line 124 between the valve 126 and the pump 127.

The variable hydraulic pump 101 provides the hydraulic motor 102 with a relatively constant flow rate of oil, so that the hydraulic motor 102 rotates with an approximately constant speed. The motor 102 therefore drives the generator 105 at a relatively constant speed, so that the generator produces a stable alternating voltage. However, the main engine 120, and therefore the variable hydraulic pump 101, are operated at varying rotational speed. A system is necessary such that the flow from the variable hydraulic pump 101 remains constant even as the variable hydraulic pump 101 rotational speed varies, to drive the hydraulic motor 102 at the desired constant speed. The controller 135, communicating with a regulator 136 of the variable hydraulic pump 101, for example an integral swash plate 118 (schematically indicated by an arrow), is configured to control the variable pump 101 such that a constant frequency power supply is produced by the generator 105.

To achieve the desired constant frequency power output, the controller 135 receives signals from both the generator 105 and from the hydraulic pump 101. In particular, the power frequency input signal 137 is received by the controller from the pulse/frequency transmitter 132 indicating the frequency of the power generated by the generator 105, and the pump speed input signal 138 is received by the controller indicating the rotational speed of the variable hydraulic pump 101. For example, for the pump speed input signal 138 the variable hydraulic pump 101 is provided with a pulse transmitter 108 that transmits pulses at 1 to 98 pulses per revolution to the controller 135. The pulse transmitter 108 typically must be adapted to a particular installation (main engine, generator, and hydraulic system) to achieve the desired results.

In similar prior art systems only the generator power frequency is monitored and used to control the flow rate from the variable hydraulic pump 101. Such prior art systems have not gained wide acceptance because the power output was not stable enough to reliably power modern electronic equipment. It has been found, however, that a suitably stable power output may be produced by incorporating information regarding the hydraulic pump 101 speed to determine the output control signal 139 to the variable hydraulic pump 101.

For example, if the frequency of the power output from the generator 105 begins to drop below the desired level due to a reduced pump rotational speed, clearly the variable hydraulic pump 101 swash plate 118 should angle out to maintain the desired constant oil flow rate in order to maintain the hydraulic motor 102 speed, and therefore the desired frequency output. If the hydraulic oil flow rate is increased too rapidly, however, the desired power frequency from the generator 105 may be overshot, resulting in the frequency rising above the desired level. Subsequently correcting for the higher frequency may similarly result in a second overshoot, and the system may either diverge from the desired frequency, or at least fail to quickly approach the desired frequency, resulting in undesirable oscillations and instability.

A given change in the swash plate 118 angle in the variable hydraulic pump 101 will produce different flow changes, depending on the speed of the hydraulic pump 101. Therefore, an optimal rate of change of the regulator at one pump speed may be too slow, or too fast, for the optimal rate of change at a different pump speed. The objective of the disclosed system is to maintain a substantially constant hydraulic oil flow rate from the hydraulic pump 101 to the hydraulic motor 102 over the operating speed range of the main engine 120. It will be appreciated that the variable hydraulic pump 101 is directly coupled to the main engine 120, and therefore the pump speed may be easily and directly determined from the engine speed by the gear ratio provided by the gear box. References herein referring to the measuring and use of the pump speed are intended to encompass measuring and using the main engine speed.

In the generator system 100, the speed of the variable hydraulic pump 101 is provided to the controller 135, and the controller incorporates the pump speed input signal 138 with the power frequency input signal 137 to control the rate of change of the swash plate 118 angle in order to maintain a constant oil flow rate, and thereby provide a stable power output from the generator 105.

In the present embodiment, the controller 135 monitors the generator 105 frequency output, and upon a variation in the frequency from the desired value, the controller uses the pump speed input signal 138 to determine an optimal rate of change of the regulator 136 for the variable hydraulic pump 101. For example, the power frequency input signal 137 may be used to determine the direction to move the regulator 136, and the pump speed input signal 138 may be used to determine how quickly to move the regulator 136.

Referring again to FIG. 2, the output terminals of the generator are connected to an electrical panel 130 having a switch 131 for connection or disconnection of the relevant electrical installation that is to be supplied with electric power from the generator 105.

A transformer (not shown) may be connected between two of the phase conductors from the generator 105 and the controller 135, so that the controller is supplied with a frequency input signal 137 from the generator 105 that is transformed down to, for example, a maximum of 24 V. In a current embodiment of the invention the pulse generator 108 is a 5 V DC PNP pulse transmitter. This maximum voltage may then conveniently also be used for the output control signal 139 to the regulator 136, and modulated to produce a desired rate of change in the regulator 136.

For power supply to the controller 135, a separate power supply, for example a battery 140 at 24 V, may be provided. A remote start and stop control line may also be provided to the controller 135 to permit manual stop and start control In an embodiment of the invention, the regulator 136 includes a proportional valve that is of known design and an electro-hydraulic pressure control pilot valve that converts an electrical input signal to a hydraulic input signal to operate a four-way servo valve directing hydraulic pressure to either side of a double-acting servo piston, which acts on the cradle swash plate 118. The system may be designed such that the angular rotation of the swash plate 118, and/or the rate of change of the angular displacement of the swash plate 118, are proportional to the received current signal, which value is dependent on both the frequency deviation of the generator 105 and the speed of the hydraulic pump 101.

Figure 3:
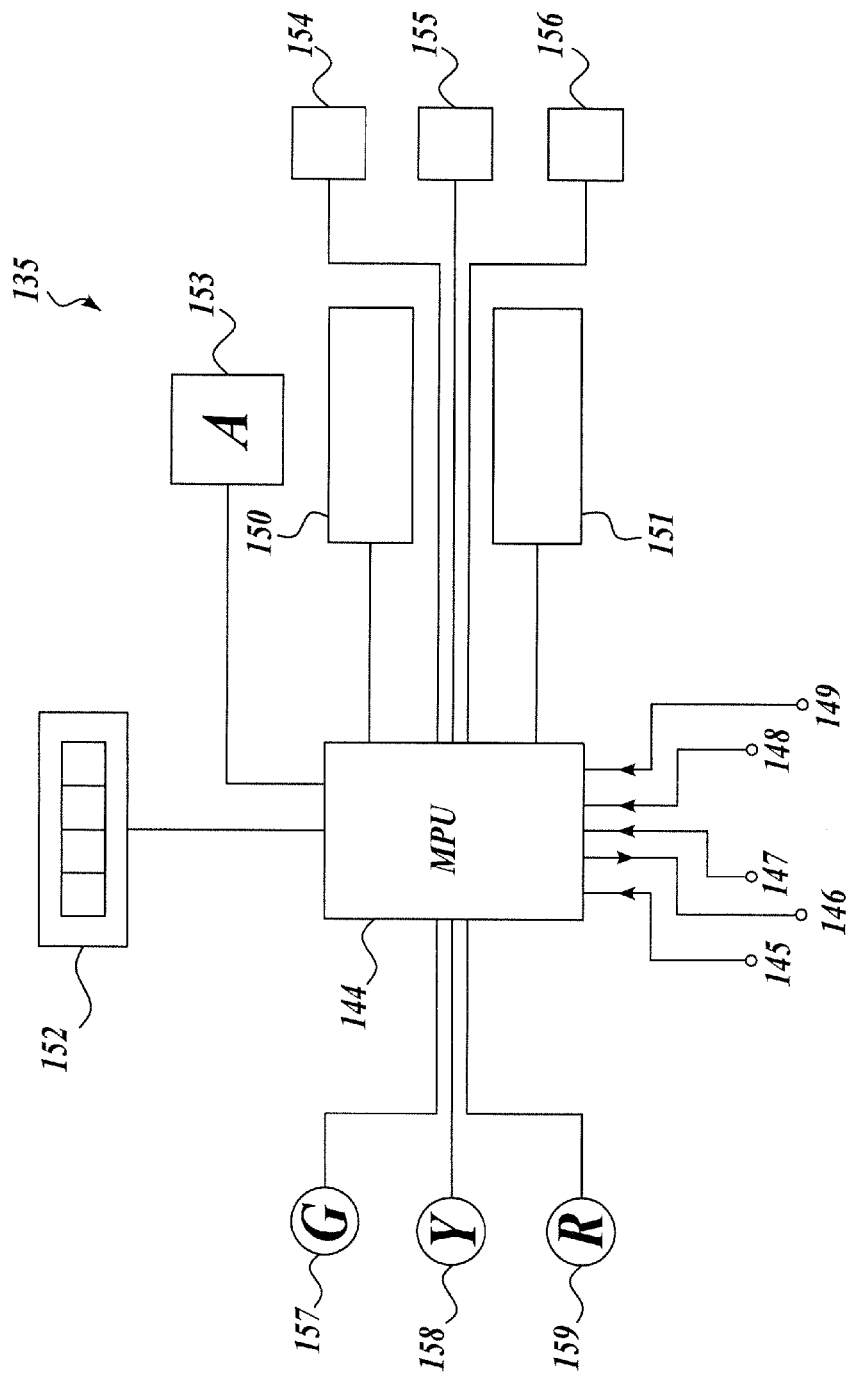
FIG. 3 is a simplified block diagram of the controller for the electric power system shown in FIG. 1.

An exemplary controller 135 is shown in simplified block form in FIG. 3, wherein a conventional microprocessor 144 is provided for controlling the generator system 100. Details of the circuit are not described, as these are believed to be easily determined by persons of ordinary skill in the art, based on the present disclosure. The output control signal 139 discussed above is provided via output terminal 146. Similarly, the power frequency input signal 137 is provided to the controller 135 via input terminal 147, and the pump speed input signal 138 is provided via input terminal 145. The remote start and stop signal 133 is supplied via terminal 148, and voltage from the battery 140 is provided via terminal 149. Two groups of control switches, designated by 150 and 151, may be provided with a view to customized installation of the generator system 100, as is known in the art.

The microprocessor 144 is also preferably connected to a display 152, showing, for example, generator frequency, accumulated operating time, and the like. An ammeter 153 may also be provided for displaying the current output control signal 139 to the regulator 136.

For example, in the currently preferred embodiment, the output control signal 139 from the controller 135 is called a pulse with modulation signal. A 24 VDC signal is sent to the solenoid in the regulator 136 valve. The signal is interrupted 2500 times per second (2.5 kHz). If the signal is "on" for most of the period, there is a very strong signal: if it is "on" for half of the period, there is a 50% strong signal and the swash plate will angle generally half way out. In addition, every 0.005 seconds (200 Hz), there is a small break (about one quarter of the 200 Hz period). This is called the dither frequency and aids in preventing the piston from sticking by providing a vibrating signal.

For operation or control of the system, there are provided three control buttons, a manual start button 154, a manual stop or run-down button 155, and a main switch 156. There are also three indicator lamps 157, 158, 159 for providing a visual indication of the status of the system.

In operation, to start the system the main engine 120 must run to drive the variable hydraulic pump 101. The main switch 156 is pressed to bring the generator system 100 in condition ready to start. The manual start button 154 is then pressed once to start the generator, causing a control current signal to be sent from the controller 135 to the regulator 136, engaging the hydraulic pump 101 and generator 105. The generator slowly increases in speed until the desired speed is achieved, and the controller 135 takes over control.

To stop the generator system 100, the user simply presses the stop or run-down button 155, and the generator slowly reduces its speed and stops.

Although in the currently preferred embodiment the primary variable-speed power source is the main engine of a marine watercraft, it will be appreciated by persons of skill in the art that the present invention could also be applied to other variable-speed power systems, such as windmills, water mills, and the like.

In the current embodiment, if the pump speed signal is missing during starting up, the regulator automatically will take the generator gradually down to a standstill. If the pump speed signal is lost during operation, the regulator will continue to regulate the hydraulic motor based on the signal indicating the system power, but will operate much slower and less accurately than before.

If the signal indicating the generator speed is missing during starting up or disappears during operation, the regulator automatically will take the generator gradually down to standstill.

An emergency mode of operation is also provided. If the generator signal is missing or the regulator for other reasons fails to regulate, a manual operation can be started based upon a certain constant electric current that can be sent to the coil on the proportional valve of the pump. The main engine must then be operated at a constant speed to maintain a correct generator speed, but the main engine speed can be anywhere in the range. This emergency control is based on a multiple revolution potentiometer giving a constant current to the proportional valve on the pump When the generator system 100 is started up for the first time, the system will be "trained" to control the actual pump speed range combined with the size of the hydraulic system by running in high speed or idle speed for teaching in. For example, the system can determine an optimal rate of change settings over the range of engine speeds. In addition, the system is set to correct frequency pulses of revolution from the pump speed signal generator. The regulator current signal will then have a correcting range over the whole speed range.

Typically, each installation is specially fitted to the diesel engine by the teach-in system. The teach-in system is very helpful, because a small main engine that typically operates at a high RPM level will require a different control response than a larger main engine that typically operates at a lower RPM level.

It will be appreciated that the optimal rate of change of the swash plate angle for the variable hydraulic pump 101 will depend, at least in part, on the rotational speed of the hydraulic pump 101. Of course, the hydraulic pump 101 is connected to the main engine 120 through a gear box or the like, and therefore the hydraulic pump 101 speed is merely a predetermined ratio of the main engine 120 speed.

Therefore, during the teach-in procedure, the system determines an optimal control signal to the hydraulic pump regulator 136 when the main engine 120 is operating at a high speed, and an optimal control signal to the hydraulic pump regulator 136 when the main engine 120 is operating at a low speed. These optimal control signals are then interpolated (or extrapolated, if necessary) to determine optimal control signals at intermediate main engine speeds.

The current teach-in procedure finds the connection between main engine speed and valve admission, and is used when the system is started up in a new installation.

The current teach-in procedure includes the following steps, wherein the current embodiment of the system is referred to as the "HDGS 50/60":

1. Go to Standby status by turning the Main switch (key switch ON). The red light is ON.
2. Press the Stop switch (arrow down switch) in more than 20 seconds. The red light goes OFF, and the display will change between parameter "81" and a frequency value "50" or "60".
3. Press the Stop switch to change value to correct frequency for the generator. The display will change between 81 and 50 or 81 and 60.
4. Press the Start switch to store correct value.
5. Press the Stop switch to change to next parameter 82. This parameter describes the number of pulses per revolution from the pulse transmitter on the main engine or the variable hydraulic pump. Press the Stop switch to change the values to correct value between 1 and 98. This number of pulses per revolution will normally be found in the hydraulic pump manual.
6. Press the Start switch to store correct value.
7. Press the Stop switch to change to next parameter 83. This parameter describes the number of seconds that is allowed to have a frequency outside +/−2 Hz before automatic shut down. Minimum value is 0 seconds, maximum 9 seconds. the recommended value is 3 seconds. Press the Start button to store the correct value.
8. Press Stop switch once.
9. Start main engine and let it run with high speed. The display will now show the hydraulic pump speed with revolutions per second.
10. Press the Stop switch until the green lamp starts to flash, and the HDGS 50/60 will engage the proportional valve on the hydraulic pump and the generator will start rotating until the target frequency is shown on the display. Then the green lamp will switch off and the generator will slowly go to stop.
11. Let the main engine run on slow speed. The display will now show the hydraulic pump speed with revolutions per second.
12. Press the Stop switch until the green lamp starts to flash. The HDGS 50/60 will engage the proportional valve on the hydraulic pump and the generator will start rotating until the target frequency is shown on the display. Then the green lamp will switch off and the generator will spin down and stop.
13. When the generator stops, turn off the Main switch (key switch) and the procedure is finished and the installation is ready for use. Aspects of the disclosed system that are believed to be novel include:
    1. An electronic signal device transmitting to the regulator a signal indicating the main engine speed and variation of this speed. This device and the software handling this system have improved the regulating speed and the regulating stability considerably.
    2. A continuously variable rate of change of oil pump displacement, such that the oil pump control depends on the main engine speed.
    3. The electronic signal device signaling the generator speed is reading the frequency or a pulse transmitter signal so it can read the speed on other devices than a generator.
    4. The regulator has a teach-in system to simply adjust the regulator individually for optimal operation independent of main engine speed range and hydraulic size.
    5. A manual emergency operating system for generator operation with constant main engine speed.

It will also be appreciated that the present system may allow an equipped vessel to have fewer auxiliary engines, although at least one auxiliary engine is believed to be desirable for emergency and possibly peak load requirements. In addition to the fuel savings and consequent reduced emissions, the disclosed system will also significantly extend the life of the auxiliary engine, and reduce the maintenance costs, by greatly reducing the time of operation of the auxiliary engine. Although the exemplary system is disclosed as an alternative to a conventional on-board auxiliary-engine-powered power generator system, it is contemplated, and will be readily appreciated by persons of skill in the art, that the present system may also be implemented in a grid arrangement with one or more conventional power generator systems. It is contemplated that in such systems the auxiliary-engine-powered system may be used to provide peak energy level requirements, or for use when the main engine is shut down.

While illustrative embodiments have been illustrated and described, it will be appreciated that various changes can be made therein without departing from the spirit and scope of the invention.

The embodiments of the invention in which an exclusive property or privilege is claimed are defined as follows:

1. An electric power generator system operably connected to a watercraft main engine, the generator system comprising:
    a variable hydraulic pump drivably connected to the watercraft main engine, the variable hydraulic pump including a regulator for adjusting a flow rate from the variable hydraulic pump;

a hydraulic motor fluidly connected to the variable hydraulic pump such that the fluid flow from the variable hydraulic pump drives the hydraulic motor;

an electrical generator drivably attached to the hydraulic motor, wherein the frequency of electricity generated by the electrical generator is determined by the rotational speed of the electrical generator;

a first sensor connected to the variable hydraulic pump that is operable to generate a pump speed input signal that indicates the speed of the variable hydraulic pump;

a second sensor electrically connected to the generator that is operable to generate a power frequency input signal that indicates the frequency of the power generated by the electrical generator; and a controller that receives the pump speed input signal and the power frequency input signal, and uses the pump speed input signal and the power frequency input signal to generate an output control signal that is transmitted to the regulator;

wherein the output control signal is received by the regulator and is operable to control the variable hydraulic pump such that the fluid flow from the variable hydraulic pump is substantially constant.

2. The electric power generator system of claim 1, wherein the first sensor is a pulse generator.

3. The electric power generator system of claim 1, wherein the second sensor is a pulse generator.

4. The electric power generator system of claim 1, wherein the variable hydraulic pump includes a movable swash plate, and the pump speed signal is used to determine how fast to move the variable hydraulic pump swash plate.

5. The electric power generator system of claim 1, further comprising an oil cooling system, and wherein a portion of the flow from the variable hydraulic pump is diverted through the oil cooling system.

6. The electric power generator system of claim 5, wherein the oil cooling system includes a means for pumping sea water to the oil cooling system for use as a heat sink.

7. The electric power generator system of claim 1, wherein the regulator has a teach-in system to adjust the regulator for optimal operation independent of main engine speed range.

8. The electric power generator system of claim 7, wherein the teach-in system determines an optimal output control signal at a high main engine speed and an optimal output control signal at a low main engine speed.

9. The electric power generator system of claim 8, wherein an optimal output control signal for an intermediate main engine speed between the high main engine speed and the low main engine speed is determined by interpolating between the high main engine speed optimal output control signal and the low main engine speed optimal output control signal.

* * * * *